United States Patent Office 3,418,147
Patented Dec. 24, 1968

3,418,147
SURFACE TREATING PIGMENTS WITH
HYDROUS METAL OXIDES
David Palmer Fields, Wilmington, Del., assignor to E. I.
du Pont de Nemours and Company, Wilmington, Del.,
a corporation of Delaware
No Drawing. Filed June 27, 1966, Ser. No. 560,839
8 Claims. (Cl. 106—308)

ABSTRACT OF THE DISCLOSURE

Coating a $TiO_2$ pigment in aqueous slurry with the white oxide of a metal by introducing into the slurry a salt of a metal, which salt has a volatile anion, and thereafter heating to volatilize both water and anion.

---

This invention relates to $TiO_2$ pigment manufacture and more particularly to novel procedures for surface treating $TiO_2$ pigments to coat them with a hydrous metal oxide to enhance and improve the pigmentary characteristics of such pigments.

In accordance with the invention, a $TiO_2$ pigment, especially an $Al_2O_3$-containing $TiO_2$ pigments from the cooxidation of $TiCl_4$ and $AlCl_3$, is surface coated with from about 1–15%, and preferably from 2–10%, by weight, calculated as the anhydrous oxide based on the $TiO_2$, of a white beneficiating hydrous metal oxide or mixture. This is accomplished by thoroughly mixing, with a slurry of the pigment, a soluble salt of the desired oxide forming metal with a volatile anion. This salt is thereafter decomposed by hydrolysis, preferably assisted by adjustment of the pH of the slurry with a volatile base such as ammonia or amines, and heat to vaporize the volatile components, and water.

The wet surface treatment of pigmentary $TiO_2$ with hydrous metal oxides in an aqueous slurry suspension of the pigment is well known. In this treatment, a water soluble metal salt, such as a sulfate, is reacted in such slurry with an alkali metal hydroxide or carbonate to precipitate the desired amount of hydrous metal oxide onto the suspended pigment. Because soluble alkali metal sulfates or like by-product salts evolved in this treatment exert an adverse effect on pigment durability and other essential qualities, a costly time-consumming washing, filtering and dewatering operation must be undertaken to effect their removal from the pigment prior to use. Thereafter, the pigment is dried at less than 300° C. and then is ground to desired fineness and particle size.

In describing the invention reference will be made to its application to the treatment of an $Al_2O_3$-containing .white pigment such as obtained from the cooxidation of $TiCl_4$ and controlled, small amounts of $AlCl_3$, or molten aluminum metal, with an oxidizing gas, such as air or oxygen, in accordance with, for example, the disclosures of U.S. Patent 2,559,638 or 2,689,781. In such procedures, the oxidation is carried out in a closed reactor at elevated temperatures ranging from about 800–1400° C. and preferably at from 900–1300° C. The resulting products comprise a soft-textured $TiO_2$ pigment of desired small particle size, that is, the products have an average particle size diameter which ranges from .05 to .5 micron and preferably ranges from .1 to .25 micron. The $Al_2O_3$ content of the pigment usually ranges from about .1 to 10% and is preferably from 0.5 to 3.5% by weight, based on the $TiO_2$.

In accordance with this invention, the raw pigment issuing from the oxidation reactor, is charged directly into an associated water-containing corrosion resistant or other desired conventional type precipitation tank wherein it is quickly quenched to form a slurry suspension containing between about 100 and 2000 grams per liter of $TiO_2$ (9–79% $TiO_2$ by weight) of dispersed pigment. Preferably, a highly concentrated slurry is formed with the $TiO_2$ concentration ranging from about 1500–1700 grams per liter. Relatively concentrated suspensions provide thicker paste formulations which afford an easier handling of the neutralized pigment slurry in the rotary kiln to which, preferably, it is directly charged for drying and by-product salt volatilization. The raw pigment issuing from the reactor will usually contain sufficient absorbed HCl and chlorine to form an acidic type slurry having a pH of from 2–6 and preferably of from 3–5. However, should the slurry not be acidic, it can be readily adjusted to that state by incorporating therein a sufficient concentration of mineral or other acid, e.g. HCl, $H_2SO_4$, $HNO_3$, $H_3PO_4$, etc.

With the slurry at the desired $TiO_2$ concentration and acidity and the pigment in the dispersed state, addition to and intimate mixing of said slurry with a sufficient concentration of a water soluble salt of an oxide-forming element is undertaken. Salts of white oxide-forming elements useful herein include those of Ti, Al, Si, Zn, Sb, Mg, Zr, Be, Cd, Ce, and Pb, etc., or mixtures of such salts, which are capable of hydrolyzing in alkaline solution to precipitate the desired insoluble white hydrous oxide or mixtures of such oxides onto the suspended pigment. Alternatively, intimate admixture and incorporation of the treating salt with the slurry can be effected by charging the slurry to an associated, agitated mixing vessel containing a solution of the desired treating salt or mixture. Preferably, the chlorides of the elements mentioned, such of $AlCl_3$, $TiCl_4$, $SiCl_4$, etc. are employed in the process, but use is contemplated of other inorganic halide salts of said elements and of their soluble sulfates and nitrates, as well as their organic acid salts, e.g. acetates, propionates, oxalates, etc. which form desired ammonium or amine neutralization products, e.g. ammonium chloride, ammonium sulfate, ammonium nitrate, ammonium acetate, ammonium oxalate, etc. and volatilize or decompose and sublime for removal from the slurry and oxide-treated pigment upon directly heating, drying or calcining the slurry and its hydrous oxide-coated pigment without an intermediate slurry filtering and pigment washing treatment.

Upon suitable incorporation in and thorough admixture of the treating salt solution with the pigment slurry and while said slurry is at temperatures ranging from about 30° C. to 80° C. with its $TiO_2$ content preferably well dispersed, precipitation of the hydrous oxide treating agent onto the pigmentary $TiO_2$ particles is undertaken. This can be accomplished by incorporating in the slurry a sufficient amount of ammonia or a basic ammonium compound, such as ammonium hydroxide, hydroxyl amine, etc., to neutralize the slurry to a pH of about 7–8.5. Thereafter the combination drying and neutralizing salt-removal step contemplated in this invention is performed by charging the neutralized slurry to conventional type furnacing means wherein heating of the slurry and oxide coated $TiO_2$ pigment is undertaken to temperatures ranging from 200 to 850° C. to effect removal of volatilized or decomposed or sublimed ammonium or amine reaction products formed in the neutralization. Such drying and salt-removal operation can be carried out in a brick-lined kiln or rotary type furnace. In the case of a rotary kiln operation, water and volatile salts can be emitted from one end of the kiln while dry oxide-coated pigment can be discharged from the other end. Steam presence in the kiln atmosphere advantageously aids in sweeping the volatiles out of the pigment. The calcining procedure is not critical, it being necessary only to raise the pigment temperature to volatilize substantially all the water and the by-product salts. The pigment must reach a temperature at least very near the sublimation temperature of the by-product salt involved. These minimum temperatures lie in the range of from 200° C. to 450° C. To dehydrate the coating oxide and to speed the operation preferred kiln discharge temperatures are in the 350° C.–850° C. range.

In instances where temperatures of a calcining order are applied to the pigment particles, agglomeration due to sintering may take place. The finished pigment should be as free as possible of multi-particle clusters in order to provide the desired end result in surface coating applications. Consequently the dried or calcined pigment can be subjected to a conventional grinding treatment prior to use, particularly in preferred applications of the pigment. Useful grinding procedures for this purpose include sand grinding in a disk mill or fluid energy grinding in a micronizer or a steam powered jet mill.

To a clearer understanding of the invention the following examples are given. These are merely illustrative of and not to be construed as limiting the underlying principles and scope of the invention.

EXAMPLE I

Employing a rutile $TiO_2$—$Al_2O_3$ pigment prepared pursuant to the disclosure of U.S. 2,689,781 by reacting $TiCl_4$ and small amounts of $AlCl_3$ with an oxidizing gas in an oxidation chamber at temperatures ranging from 800–1400° C., the series of oxide coated pigment compositions shown in Table I for this example were obtained. In such preparation the raw pigment on discharge from the oxidation reactor was fed into associated slurry tanks to form aqueous slurry suspensions having the $TiO_2$ concentrations set forth in said table and acidic pH values varying from 3–5. The acidic pigment slurry suspensions thus formed were separately pumped into an associated pipe line type of mixing chamber wherein intimate association of each slurry with an aqueous solution of chloride treating salt or salts as shown in the table was brought about. As each reagent-pigment slurry at a temperature of about 60° C. passed through the mixing line, a stoichiometric quantity of aqueous ammonia was caused to be metered into said line as a neutralizing agent for purposes of adjusting the pH of the slurry mixture to a value of from 8 to 8.5 and effect precipitation on and coating of the suspended pigment with the amounts of hydrous oxide on an hydrous basis which are specified for each pigment in Table I. Thereafter each neutralized slurry, in the form of a relatively thick, viscous paste, was fed directly and without being subjected to filtering and washing treatment, into an associated rotary kiln furnacing means and heated therein at about 600° C. for about 5 hours with such heating being accomplished by means of a combination of fuel combustion and introduction of superheated steam. Ammonium salts formed during neutralization and volatilized during slurry heating were continuously withdrawn from the kiln for collection and recovery in an associated water scrubber. The dried, calcined oxide-treated pigments were ground in a conventional fluid energy mill operated at 1500 lbs./hr. throughput, with $TiO_2$ passage through the mill effected by means of steam at 100 lbs./sq. in. with 100° F. of superheat. The finished pigments exhibited excellent pigment characteristics and had properties equivalent to or improved over those derived from the treatments of U.S. 2,387,534; 2,357,089 and 2,284,772.

EXAMPLE II

Using calcined pigmentary $TiO_2$ produced by a sulfate process following the procedures of U.S. Reissue Patent 18,854, a group of the $TiO_2$ pigment compositions listed for this example in Table I below were prepared. In such preparation an aqueous, acidic slurry of the $TiO_2$ in the concentrations set forth in said table, was admixed with the various treating agents listed in the table and the slurry mixture was calcined at 450° C. over a period of 6 hours in a rotary kiln in the presence of ammonia and steam flowing countercurrent to the passage of the pigment slurry through the kiln. Oxide-coated products exhibiting improved stability and resistance towards weathering and discoloration were obtained.

TABLE I

| Example | Added oxide in finished pigment | | | | Treating agents, conc. as oxide* | | | | | Slurry concentration ($TiO_2$)* |
|---|---|---|---|---|---|---|---|---|---|---|
| | Percent $Al_2O_3$ | $TiO_2$ | $SiO_2$ | $ZnO_2$ | $AlCl_3$ | $TiCl_4$ | $TiOCl_2$ | $SiCl_4$ | $ZnCl_2$ | |
| I | 4 | | | | 100 | | | | | 1,500 |
| I | | 1 | | | | 727 | | | | 1,500 |
| I | | | 2 | | | | | 525 | | 1,500 |
| I | 2 | 1 | | | 100 | 727 | | | | 1,500 |
| I | 4 | 1 | 2.5 | | 100 | 727 | | 525 | | 1,500 |
| I | 2 | 1 | | 0.5 | 100 | 727 | | | 250 | 1,500 |
| I | 2 | 1 | | | 100 | | 100 | | | 1,500 |
| II | 2 | | | | 100 | | | | | 700 |
| II | 2 | 1 | | | 100 | 727 | | | | 700 |

*Gms./l.

Although the invention has been described as applied to particular, specific embodiments it obviously is not limited thereto. Thus while particularly applicable to rutile $TiO_2$ recovered from the oxidation of $TiCl_4$ or the co-oxidation of $TiCl_4$ in the presence of small amounts of $AlCl_3$ it is equally applicable to the treatment of other forms of $TiO_2$, including anatase as well as to extended forms of that pigment containing such extenders as $BaSO_4$, $CaSO_4$ or various silicates. In incorporating the treating salt with the pigment it is preferred to mix the latter with a solution of a metal salt such as $AlCl_3$ and then add the contemplated neutralizing base to this mixture until precipitation of the oxide is complete. Alternatively, admixture of the acidic slurry containing pigment and treating agent with the base can be effected after it is placed in the kiln. For example, an acidic slurry containing $TiO_2$–$AlCl_3$ can be suitably mixed and then placed in a kiln and calcined under an ammonia atmosphere. Metal salts which hydrolyze readily like those of titanium, zirconium, aluminum, silicon, antimony, for example, can be readily handled by calcination. $TiO_2$ slurries which have been treated with, for example, $AlCl_3$ can be placed directly into the kiln wherein HCl will boil off with the water.

In effecting admixture of the pigment and treating salt use can be made of conventional type mix tanks, pipe line mixers, jet mixing, etc., as long as the pigment particles under treatment remain dispersed in intimate contact with the treating reagents. In effecting drying-calcination of the oxide treated pigment recourse can be had to tray dryers, rotary kilns, spray driers and other suitable means for removing sublimable or vaporizable by-products present in the pigment other than by expensive washing or filtration treatments.

I claim:

1. In a process for surface coating a white inorganic pigmentary material with a beneficiating white oxide of a metal selected from the group consisting of Al, Be, Ce, Cd, Mg, Pb, Sb, Si, Ti, Zn and Zr, the improvement which comprises mixing with an aqueous slurry of said pigmentary material a salt of at least one of said metals having a volatile anion, decomposing said salt thereby coating the pigmentary particles with hydrous oxide derived from said salt, and removing water and volatilizing said anion by heating said slurry in the range of from 200 to 850° C.

2. The process of claim 1 wherein the freshly mixed said aqueous slurry containing salt is acid and the said oxide is formed from the said salt by adding a volatile base to the said slurry of said pigmentary material and said salt to raise the pH of said slurry to from about 7 to about 8.5.

3. The process of claim 2 wherein sufficient of said salt is mixed into said slurry to provide a surface coating of said white oxide of from about 1% to about 15% by weight based on the said pigmentary material.

4. The process of claim 3 wherein the said slurry of the said pigmentary material contains from about 100 grams to about 2,000 grams per liter of $TiO_2$.

5. The process of claim 4 in which the said salt is a chloride.

6. The process of claim 3 wherein the said pigmentary material is a $TiO_2$ pigment containing from about 0.1% to about 10%, by weight based on $TiO_2$, of $Al_2O_3$.

7. The process of claim 6 wherein the said base is $NH_4OH$.

8. The process of claim 6 wherein the said base is $NH_3$.

References Cited

FOREIGN PATENTS 969,352   9/1964   Great Britain.

JAMES E. POER, *Primary Examiner.*

U.S. Cl. X.R.

106—300, 309

Disclaimer 3,418,147.—*David Palmer Fields*, Wilmington, Del. SURFACE TREATING PIGMENTS WITH HYDROUS METAL OXIDES. Patent dated Dec. 24, 1968. Disclaimer filed Sept. 3, 1971, by the assignee, *E. I. du Pont de Nemours and Company*.

Hereby enters this disclaimer to claim 8 of said patent.

[*Official Gazette January 25, 1972.*]